United States Patent [19]

Lundblom

[11] Patent Number: 4,655,268

[45] Date of Patent: Apr. 7, 1987

[54] VERTICAL CUT WOOD SHAPER

[76] Inventor: Richard J. Lundblom, 1661 Ashton Dr., Virginia Beach, Va. 23464

[21] Appl. No.: 833,171

[22] Filed: Feb. 26, 1986

[51] Int. Cl.$^4$ ............................ B27C 9/02; B27C 5/00
[52] U.S. Cl. .............................. 144/3 R; 144/134 R; 144/253 R; 144/367; 144/371; 409/134; 409/163
[58] Field of Search ............... 409/130, 134, 137, 158, 409/163, 178, 182, 226; 144/1 R, 2 R, 3 R, 3 E, 253 R, 134 R, 136 R, 367, 371, 5

[56] References Cited

U.S. PATENT DOCUMENTS

| | | |
|---|---|---|
| 1,223,324 | 4/1917 | Hansen . |
| 1,305,570 | 6/1919 | Soderstrim . |
| 1,959,241 | 9/1930 | Kelley . |
| 2,826,125 | 1/1953 | Dougherty . |
| 3,008,501 | 11/1961 | Hammer ............................ 144/3 R |
| 3,342,108 | 10/1965 | Lorenz . |
| 3,450,001 | 3/1967 | Fortune . |
| 4,062,031 | 12/1977 | Piazzola . |

FOREIGN PATENT DOCUMENTS 117198  11/1926  Switzerland ............................ 144/5

Primary Examiner—W. D. Bray
Attorney, Agent, or Firm—Dennison, Meserole, Pollack & Scheiner

[57] ABSTRACT

A wood shaper utilizing multiple vertical cutting shaper assemblies mounted on the opposed end portions of a horizontal shaft. Each shaper assembly has, to the opposite sides thereof, an elongate guide fence and an elongate finger guard selectively adjustable relative to each other and the shaper assembly therebetween. Each guide fence mounts a pair of horizontal support bars for independent vertical adjustment relative to each other. The support bars align with the intake and discharge sides of the associated shaper assembly. As a variation, a second commonly driven horizontal shaft can be provided parallel to the first shaft. The second shaft will mount, at one end thereof, a third vertical shaper assembly received between an elongate guide fence with dual support bars and a laterally adjustable finger guard.

19 Claims, 15 Drawing Figures

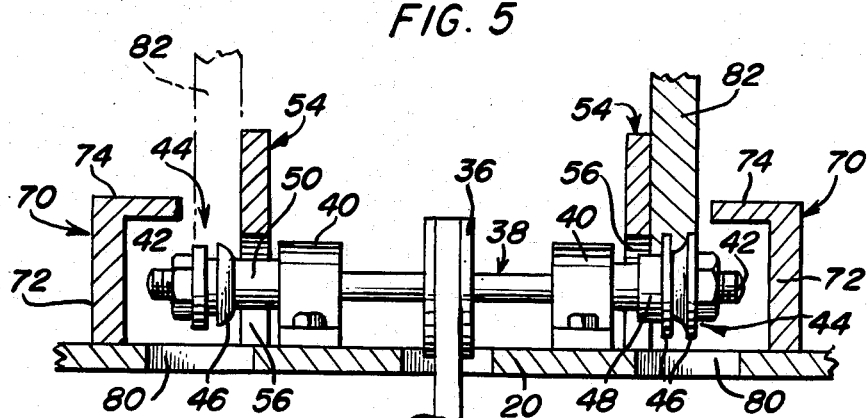
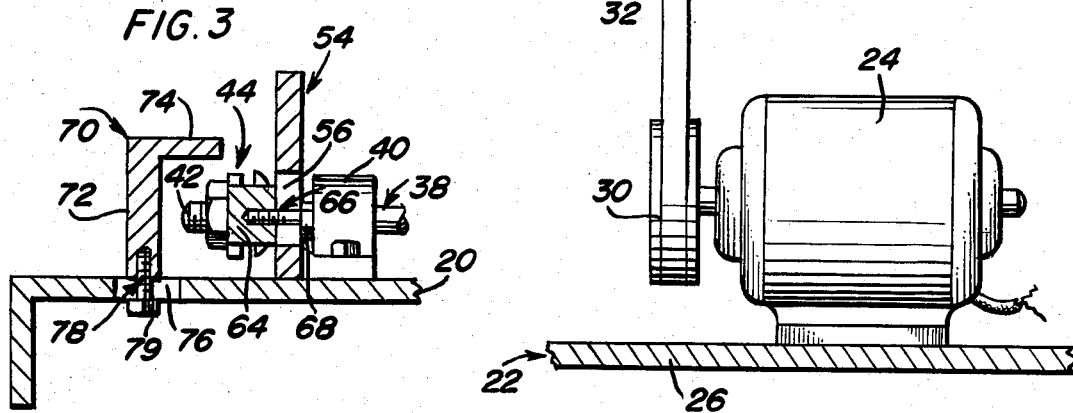
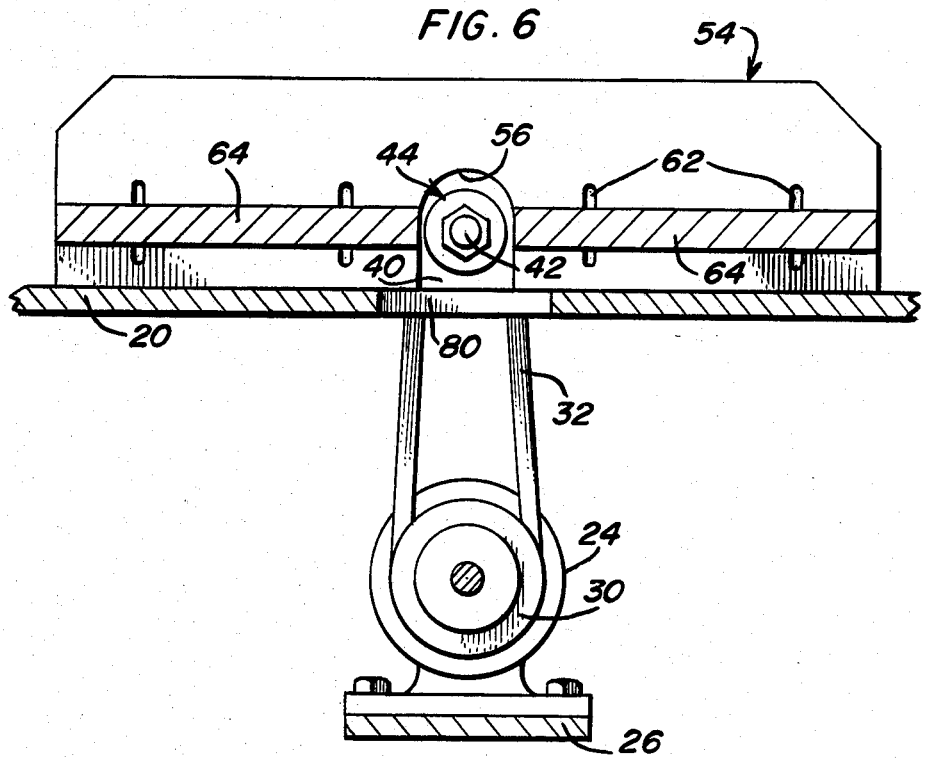

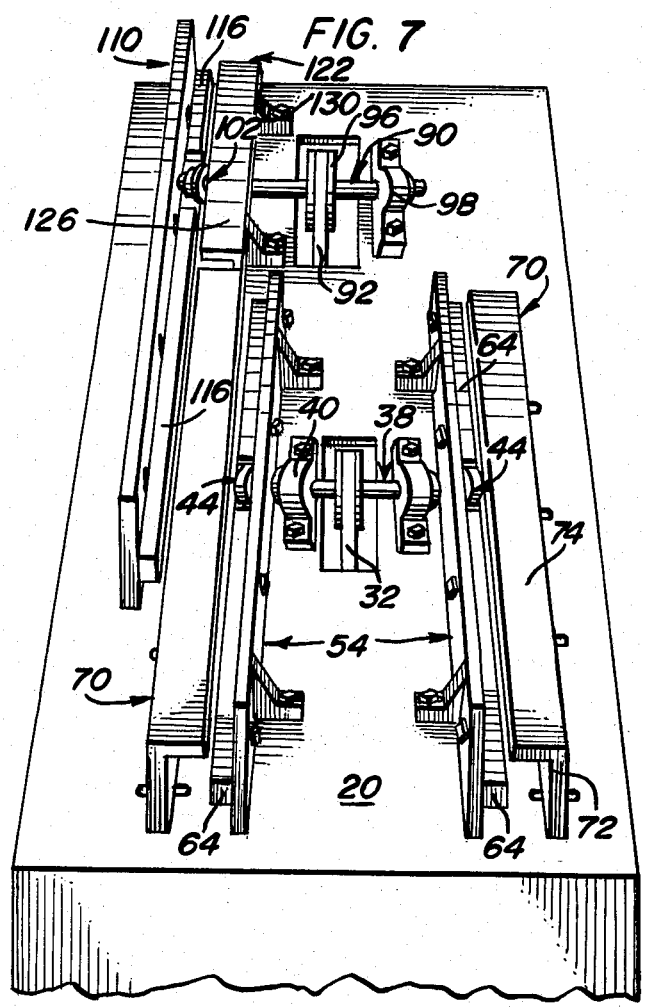
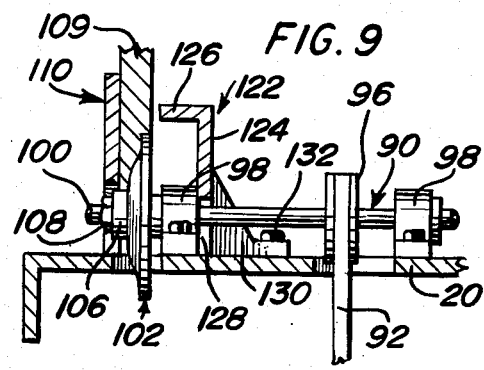
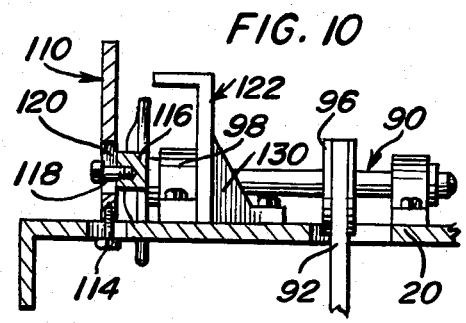
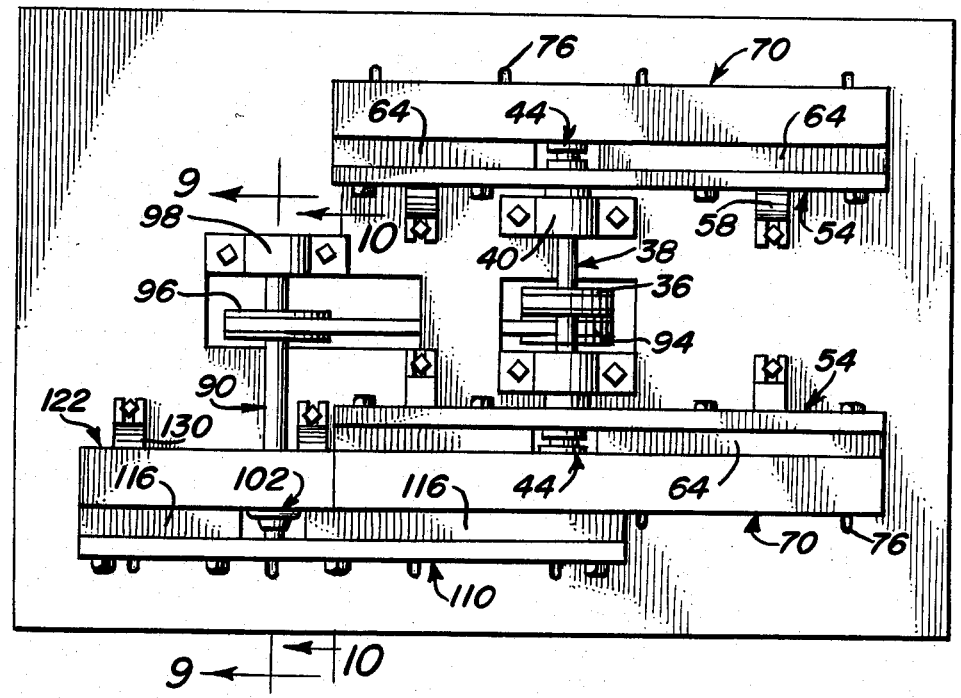

VERTICAL CUT WOOD SHAPER

BACKGROUND OF THE INVENTION

The invention herein relates to wood shaping apparatus, in particular apparatus for the defining of edge cuts on, and the shaping of, the edge portions of interengaged components. Typically, and as an example, raised paneled doors, decorative wall assemblies, and the like frequently require, in addition to the shaped panel itself, both vertical and horizontal stiles, edge grooved and shaped for an internesting assembly.

The necessary edge grooving and shaping as currently performed normally utilizes conventional wood working equipment frequently comprising a vertical shaft mounting a horizontally operated cutter with the workpiece supported on a table and either movable therewith or relative thereto past the cutter. Such apparatus, while set up to perform only a single type of cut or shaping operation, will frequently provide for an interchanging of the cutter or shaping blades whereby, through the relatively tedious and time consuming procedure of interchanging the cutters and adjusting the apparatus to each particular task, the various interrelated cuts and shapes can be obtained. Alternatively, and as an option available particularly to large producers, multiple different machines, each dedicated to a particular task, can be utilized.

Conventional wood shaping apparatus, particularly such apparatus as can be adapted for use in providing the edge cutting and shaping required in the formation of raised panel structures, are normally difficult to set up and inherently give rise to safety problems and potential hazards to the user both because of the orientation of the operating components and the manner in which the wood is to be introduced and guided therethrough. The limitations of the known equipment, particularly in the area of safety, also provides an inherent limitation on the operating speed and overall efficiency of the apparatus.

SUMMARY OF THE INVENTION

The present invention is particularly directed to wood shaping apparatus which improves on all aspects of the apparatus currently universally used. In connection therewith, the apparatus of the invention provides for multiple operations in a compact assembly with the operations being independently performed without set-up changes, and associated down-time and delays, normally encountered in the performance of separate cutting and/or shaping operations. In connection therewith, in the formation of a simple framed panel, whether this be a door, decorative partition, or the like, it is normally necessary to cut and shape the inner edges of both the vertical and horizontal stiles, provide a differing yet mating shaped configuration across the opposed ends of the horizontal stiles to mate with and engage within the vertical stiles and, in many instances, provide yet a third configuration about the central panel itself for engagement within the shaped inner edges of both the vertical and horizontal stiles. The present invention contemplates the provision of all of the necessary cuts and shaping operations with an initial set-up of the equipment and in a manner which allows for a safe high speed production of multiple duplicate assemblies.

Also of particular significance is the construction of the apparatus of the invention in a manner capable of accommodating a vertical orientation of the workpiece with the cutter or shapers recessed and fully protected to substantially preclude physical access thereto by a user of the device, thereby avoiding any danger of accidental injury. As an additional factor in enhancing the safety of the apparatus, the actual cutting and shaping components are so positioned whereby the discharge therefrom are directed away from the user of the equipment.

The invention also contemplates a basic simplicity of construction which allows for expeditions varying of the set-up of the various components of the apparatus as required in varying the shape, depth or width of the cuts, as well as the accommodation of woods of varying widths. Such adjustments include adjustable guide fences, work supporting bars and finger guards.

The apparatus of the invention includes a base support plate with a drive motor mounted therebelow. A belt-driven transverse shaft is supported in horizontal spaced overlying relation to the base plate by a pair of spaced pillow blocks with the projecting opposed ends of the shaft mounting vertical cutters, shapers or the like.

A guide fence is positioned immediately inward of each shaper or cutter and secured to the base plate for selective adjustment toward and away from the shaper or cutter. The guide fence in turn mounts elongate bar supports vertically adjusted on the fence and aligned to the opposite sides of the cutter, defining, in conjunction with the associated cutter, the depth of the cut. A finger guard is mounted to the opposite side of each cutter from the guide fence and is selectively adjusted toward and away from the cutter to vary the width of the gap through which the workpiece is introduced, preferably providing a slot of a width only sufficient to accommodate the width of the workpiece.

As desired, and particularly useful in those operations wherein three distinct cutting or shaping operations are required, a second horizontal shaft can be mounted on the base plate laterally spaced from the first shaft and similarly belt driven from the single motor. The second shaft will include a single end mounted vertical cutter or shaper assembly aligned with one of the previously referred to cutters and similarly provided with a cutter enclosing guide fence and finger guard.

The vertical orientation of the cutter or shaper assemblies, and the protection provided by the cooperating guide fences and finger guards particularly adapt the apparatus of the invention to high speed operation with shaft speeds on the order of 9,000 to 13,000 rpm.

Other features and advantages of the invention are considered to reside in the details of construction and manner of use of the invention as more fully hereinafter described and claimed.

BRIEF DESCRIPTION OF THE DRAWINGS

FIG. 3 is an enlarged cross-sectional detail taken substantially on a plane passing along line 3—3 in FIG. 2;

FIG. 5 is a cross-sectional view taken substantially on a plane passing along line 5—5 in FIG. 2;

FIG. 6 is an enlarged cross-sectional detail taken substantially on a plane passing along line 6—6 in FIG. 2;

FIG. 7 is a top perspective view of a modification of the apparatus of the invention;

FIG. 8 is a top plan view of the apparatus of FIG. 7;

FIG. 9 is a cross-sectional detail taken substantially on a plane passing along line 9—9 in FIG. 8;

FIG. 10 is a cross-sectional detail taken substantially on a plane passing along line 10—10 in FIG. 8;

DESCRIPTION OF PREFERRED EMBODIMENTS

Figure 1:
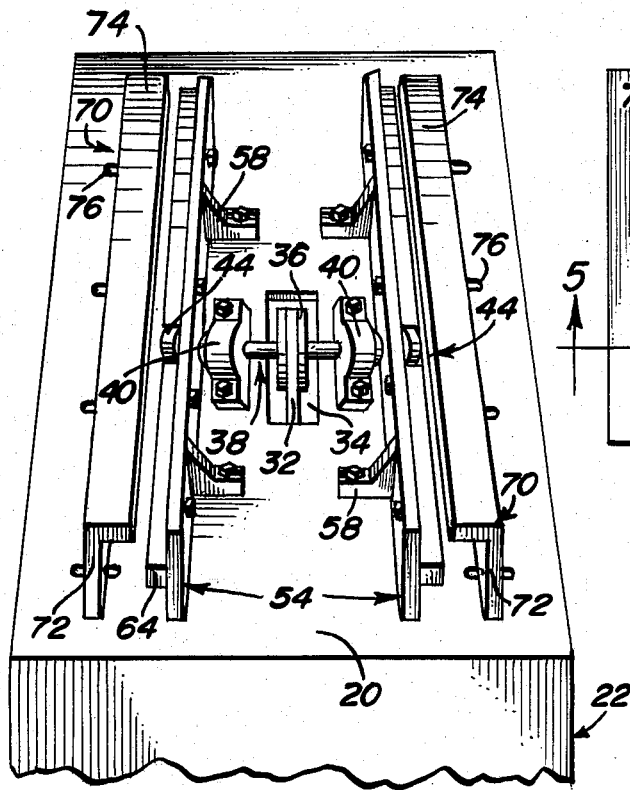
FIG. 1 is a top perspective view of the apparatus of the invention.
Figure 2:
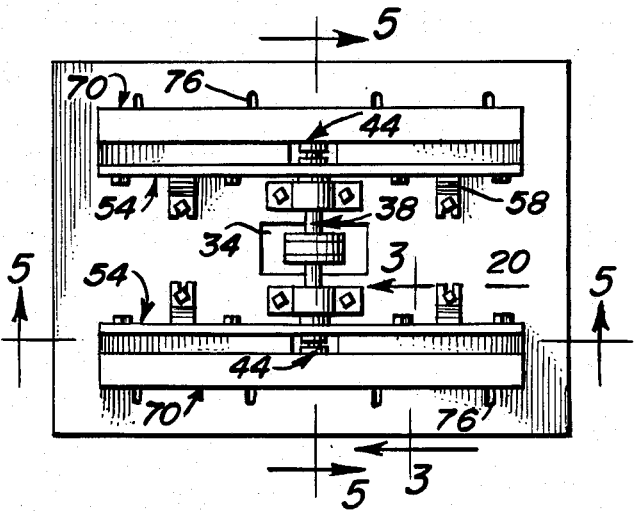
FIG. 2 is a top plan view thereof.
Figure 4:
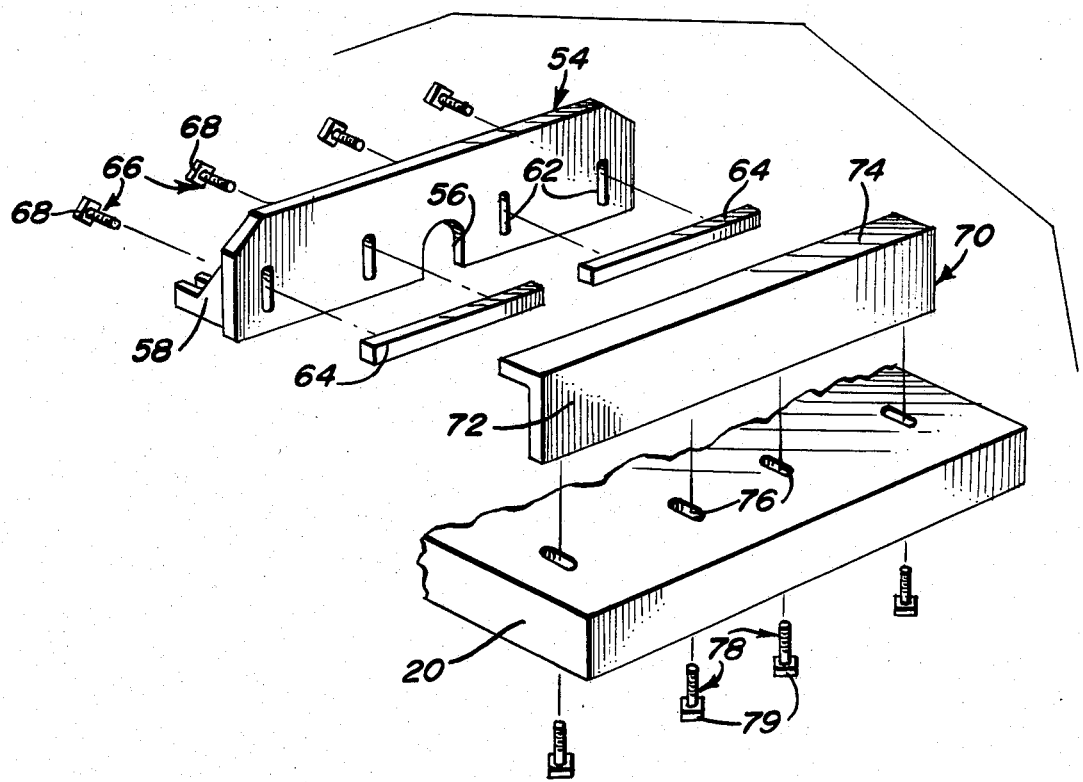
FIG. 4 is an exploded perspective view of a guide fence, support bars and finger guard.

Referring now more specifically to the drawings, the apparatus of the present invention includes a working height base plate 20, normally the top panel of a cabinet or support stand 22. The single contemplated power source is a drive motor 24, preferably, although not limited to, an electric motor. The motor 20 will mount within the support structure 22 below the base plate 20 on an appropriate support shelf 26 or the like. The motor drive shaft 28 mounts a drive pulley 30 for rotation therewith. An elongate drive belt 32 is entrained about the pulley 30, projects upwardly through an opening 34 defined through the base plate 20, and is entrained in driving engagement about a second pulley 36.

The pulley 36 is fixed to a horizontal driven shaft 38 rotatably received transversely across the base plate 20 and through a pair of laterally spaced pillow blocks 40 bolted or otherwise anchored to the base plate 20. The opposed projecting end portions 42 of the shaft 38 in turn mount vertically positioned shaper assemblies 44 which can comprise, in each instance, multiple vertical cutters 46 or cutters in combination with a support bearing 48 as shall be described presently. Each shaper assembly 44 will normally have the components thereof fixed to the shaft end portion 42 in any appropriate manner with the position of the components on the respective shaft end portions 42 being determined by appropriate spacers or collars 50 between each shaper assembly 44 and the adjoining pillow block 40. An appropriate retaining nut 52 will also be threaded on each end portion 42 of the shaft 38 for a retention of the components of the corresponding shaper assembly 44.

A steel guide fence 54, in the nature of a flat elongate vertical panel, is positioned transversely across the driven shaft 38 immediately inward of each shaper assembly 44 and between the shaper assembly 44 and the corresponding pillow block 40.

Each guide fence 54 includes a central downwardly opening notch 56 receiving the driven shaft 38 therethrough and allowing for a simplified upward removal of the guide fence 54 as desired. The central notch defines a pair of aligned guide fence sections projecting a substantial distance to each side of the shaft 38 and the shaft-mounted shaper assembly 44 associated therewith.

Each guide fence 54, in laterally spaced relation to each side of the shaft 38, is provided with mounting feet 58 which are centrally bifurcated and project inwardly in overlying relation to the base plate 20 for the reception of retaining bolts 60 therethrough. The slot defined by each bifurcated foot 58 is elongate, allowing for a degree of lateral adjustment of the fence 54 toward and away from the associated shaper assembly 44 within the limits of the space provided between the shaper assembly 44 and the corresponding pillow block 40. It will of course be appreciated that the feet 58 are rigid with the corresponding fence 54.

Each fence 54 further includes a plurality of vertically elongate slots 62 defined therethrough, normally provided in pairs to each side of the central notch 56, the slots 62 of each pair being in laterally spaced relation to each other. Each pair of slots 62 mounts an elongate vertically adjustable horizontal bar or bar support 64. Each bar is of a length substantially coextensive with the length of the section of the fence 54 from the central notch 56 to the remote vertical end thereof. Each bar 64 is mounted by a pair of bolts 66 engaged through the corresponding pair of vertical slots 62 and threaded within threaded bores provided in the bar 64. Each of the bolts 66 includes an enlarged head 68 thereon which bears against the inner face of the fence 54 to each side of the corresponding slot 62 whereby upon a tightening of the bolts 66, the corresponding bar 64 is drawn into locked engagement against the outer face of the fence 54 and thus fixed in horizontally adjusted position. As desired, a washer or similar force distributing plate can be provided about each bolt 66 between the enlarged head 68 thereof and the face of the fence 54.

The two bars 64 associated with each guide fence 54 generally align to the opposite sides of the associated cutter or shaper assembly 44 with the upstream bar 64, that bar to the side of the cutter from which the workpiece is introduced, being of a height adjusted in accord with the depth of cut desired. In other words, the upstream bar 64 is to receive the edge of the workpiece flush thereon for movement into and through the cutter. Thus, the height of this upstream bar 64 relative to the cutter assembly 44 will determine the depth of the cut.

The corresponding downstream bar 64, that bar beyond the cutter or shaper 44, will be slightly elevated relative to the upstream bar to receive and support the trimmed or shaped edge of the workpiece as it exits from the cutter. In this manner, a continued support of the workpiece is provided throughout the full extent of its travel into, through and beyond the cutter or shaper assembly.

Positioned immediately outward of each cutter or shaper assembly 44, and paralleling the guide fence 54 and bars 64 thereon, is an elongate finger guard 70 coextensive in length with the associated guide fence 54 and of a height slightly greater than that of the maximum contemplated height of the shaper assembly 44 and the associated bar supports 64.

Each finger guard 70 includes a vertical panel 72 and an integral laterally inwardly directed top panel 74. The vertical panel 72 is positioned with the bottom edge thereof seated on the upper surface of the base plate 20 and extending transversely across a series of slots 76 therein. Each finger guard 70 is adjustably mounted for movement toward and away from the guide fence 54 to provide for the accommodation, with minimum clearance, different width workpieces and/or shaper assemblies 44 in a manner which allows for free movement of the workpiece through the shaping operation while at the same time effectively reducing or eliminating any possibility of accidental injury to the user through engagement with the cutter or shaper assembly 44.

Each of the finger guards 70 is mounted for lateral ajustment by threaded bolts 78 extending through the respective base plate slots 76 and into engagement with internally threaded bores through the lower edge of the vertical panel 72 of the corresponding finger guard 70. Each of the bolts 78 includes an enlarged head 79 thereon which bears against the undersurface of the base plate 20 to the sides of the slot 76, thus allowing for a downward clamping of the finger guard 70 against the upper surface of the base plate in any laterally adjusted position relative to the guide fence 54 within the limits of the length of the slots 76. In addition to providing an effective barrier against accidental engagement of the hands of the user with the shaper assembly 44, the top panel 74 defines a convenient rest as might be needed in guiding the workpiece through the slot defined between the inner edge of the horizontal panel 74 and the face of the guide fence 54. Further, the overhanging configuration of the finger guard 70, in conjunction with the projecting bar supports 64, tends to define an elongate tunnel which confines and longitudinally discharges any cuttings, chips or the like which do not discharge directly through the port or opening 80 provided through the base plate 20 immediately below each cutter or shaper assembly 44. Thus, the actual cutting site is maintained clear and unencumbered.

The provision of vertical cutter or shaper assemblies 44 on both ends of the horizontal driven shaft 38 is considered particularly significant in achieving maximum efficiency and productivity in the shaping of stiles, frames, moldings, and the like. Basically, and noting in particular FIGS. 1 and 5, the right-hand shaper assembly 44 can be used to provide the longitudinal cut or cuts on a workpiece 82. See for example the longitudinal or inner edge cuts 84 along the vertical and horizontal stiles or frame members 86 in FIGS. 11 and 12.

The left-hand shaper assembly 44 will comprise an assembly of components adapted to cut and shape the ends 88 of cross stiles or frame members 86 to mate with the formed longitudinal inner edge cuts 84 and thus providing for an intimate engagement of the frame members at the joinders thereof.

By effectively utilizing both ends of the commonly driven shaft 38, the two edge cuts or shapings required to define the stile, frame, molding, or the like are substantially simultaneously achievable with a single piece of equipment and without requiring time delaying setup changes.

As noted with regard to the right hand cutter or shaper assembly 44 in FIG. 5, one of the components 48 can be in the nature of a support bearing mounted on the shaft 38 for free rotation relative thereto and as a means for supporting the workpiece 82, as the lower edge rides thereover, throughout the travel of the workpiece through the cutter assembly. The provision of such a bearing 48, where possible and depending upon the nature of the multiple grooves or cuts to be formed, provides a positive gauge or guide, in addition to bars 64, to the depth of the cuts.

The present invention also contemplates a modified apparatus, as illustrated in FIGS. 7-10, wherein a second horizontal, driven shaft 90 is provided and belt driven by endless belt 92 entrained about a second pulley 94 mounted on the driveshaft of the single drive motor 24 and extending therefrom about a pulley 96 fixed to the shaft 90.

Those components of the apparatus of FIGS. 7-10 which duplicate the components of the originally described apparatus in both structure and function have been similarly numbered.

The driven shaft 90 is rotatably mounted by and between a pair of pillow blocks 98 bolted to the base plate 20 in laterally spaced parallel relation to the first driven shaft 38. Noting FIGS. 7, 9 and 10, the left end portion 100 of shaft 90 projects beyond the corresponding pillow block 98 and mounts a vertical cutter or shaper assembly 102 utilizing, as desired, a spacer or spacing collar 104, a bearing component 106, and a retaining nut 108.

The cutter or shaper assembly 102 generally parallels the left hand cutter assembly 44 associated with the shaft 38 in outwardly spaced relation thereto whereby the outer face of the left hand finger guard 70 can function as a general alignment means for workpieces 109 as shall be described presently.

An elongate steel guide fence 110 is positioned to extend transversely across the end portion 100 of the shaft 90 outward of the cutter or shaper assembly 102. This guide fence 110 will determine the direction and alignment of the workpiece 109 as it moves through the shaper assembly 102, and as such, will substantially parallel the guide fence 54 and finger guard 70 associated with the left hand shaper assembly 44 as viewed in FIG. 7. It will also be noted that a substantial portion of the guide fence 110 will extend coextensive with the adjacent finger guard 70 to cooperate therewith in aligning a workpiece. As desired, the guide fence 110 can be adjustably clamped to the base plate 20 for lateral adjustment toward and away from the associated shaper assembly 102. This can be effected by the use of slotted feed as previously described, or, alternatively, and as suggested in FIGS. 8 and 10, by elongate slots 112 defined through the base plate 20 and accommodating threaded bolts 114 threadedly engaged within blind bores defined through the lower base plate engaging edge of the guide fence 110.

As with the previously described guide fences 54, the guide fence 110 mounts a pair of generally aligned bar supports 116 longitudinally along the inner face thereof and extending respectively from the opposed sides of the cutter or shaper assembly 102 to the respective vertical ends of the guide fence 110. Each of these bars or bar supports 116 is mounted for vertical adjustment by a pair of threaded bolts 118 engaged through vertical slots 120 in the guide fence 110 and into blind threaded bores in the fence engaging face of the bars 116. As with the previously described mounting and adjusting bolts, each bolt 118 is to include an enlarged head which bears against the outer surface of the fence 110 to the sides of the corresponding slot 120. Also, as previously described, the height of the bars 116 will normally be positioned relative to the cutter or shaper assembly 102 to provide full support for the lower edge of the workpiece 109 as the workpiece moves to, through and beyond the cutter assembly 102.

An elongate finger guard 122 extends transversely across the driven shaft 90 inward of the cutter or shaper assembly 102 in parallel relation to the guide fence 110. The finger guard 122 is shorter than the associated guide fence 110 and forms, in effect, a rversed and elevated continuation of the left hand finger guard 70 associated with the left hand shaper assembly 44. The finger guard 122 includes an elongate vertical panel 124 of a height greater than that of the finger guard 170 to accommodate the normally greater diameter of the shaper assembly 102. The guide fence 110 can similarly be of a greater height than fence 54.

The vertical panel 124 of the finger guard 122 terminates in an integral outwardly directed upper panel or flange 126 directed toward the shaper assembly 102. The finger guard 122 also includes an enlarged downwardly opening central notch or recess 128 in the vertical panel 124 accommodating the shaft 90 therethrough, the notch in fact being of a height sufficient to accommodate the adjacent pillow block 98 whereby a full range of lateral adjustment of the finger guard 122 can be effected notwithstanding the relatively close positioning of the pillow block 98. This lateral adjustment is achieved by means of a pair of inwardly projecting bifurcated feet rigid with the inner face of the finger guard 122 and having securing bolts 132 engaged therethrough and into the base plate 20, all as previously described with regard to the feet 58 associated with the guide fences 54.

The adjustable nature of the finger guard 122, either with or without an adjustment of the cooperating guide fence 110, is significant in providing for an accommodation of the space therebetween to workpieces of varying thicknesses while maintaining actual direct access to the cutter or shaper assembly 102 to the minimum required for introduction of the workpiece, thereby greatly enhancing the safety of the apparatus. It is also to be appreciated that the overhang nature of the finger guard 122 provided by the horizontal panel 126 acts, in conjunction with the cutter opening through the base plate 20 itself, to discharge the cuttings away from the workpiece and away from the user of the apparatus.

Figure 11:
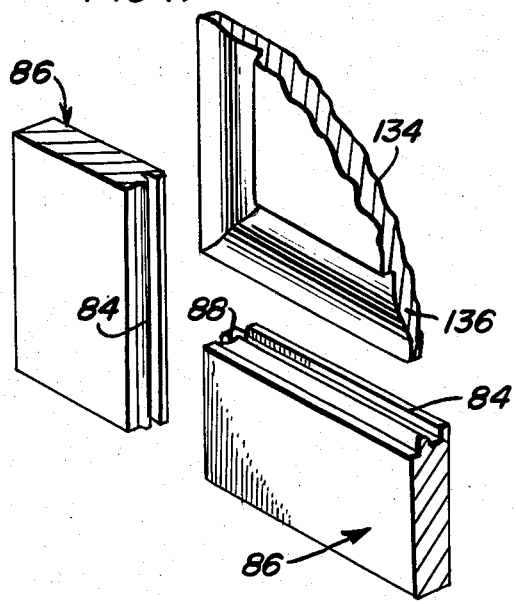
FIG. 11 is an exploded perspective view of portions of assemblable shaped components illustrating the multiple cuts simultaneously achievable by the apparatus of the invention.
Figure 12:
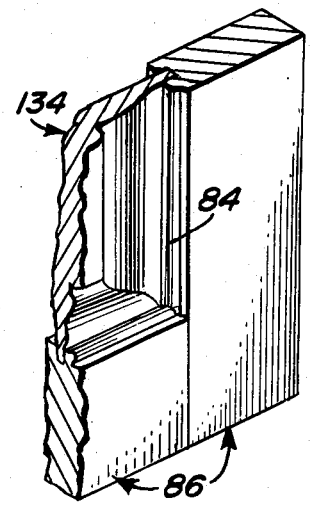
FIG. 12 is a partial perspective view of the components of FIG. 10 as assembled.

The cutter or shaper assembly 102 is particularly adapted for, and intended for use as a means for defining the edge configuration of a raised decorative panel as suggested by the panel 134 in FIGS. 11 and 12. The configured peripheral edge or edges 136 of the panel 134, shaped as best seen in FIGS. 9 and 11, are particularly adapted for accommodation within the shaped edges 84 of the previously described shaped frame members 86. Such raised decorative panels 134 are frequently provided in doors, shutters, and the like. The capacity of properly edge cut and shape such panels almost simultaneously with the edge shaping and cutting of the framing members or stiles associated therewith, all on the same apparatus and without multiple changes in the cutter assembly set-up, is highly significant in achieving an economical, efficient and productive manufacturing procedure whether employing a single user or operator or multiple users simultaneously accessing the various cutter and shaper assemblies.

The particulr arrangement of the shaper assemblies, as best noted in FIG. 7, is significant in allowing for maximum utilization of the shaper assemblies regardless of the length of the workpieces and notwithstanding the compact nature of the apparatus. More particularly, and with continued reference to FIG. 7, the right hand shaper assembly 44 is freely accessed by elongate workpieces regardless of the length thereof in that there are no obstructions aligned with the workpiece accommodating slot between the guide fence 54 and the finger guard 70. As such, this cutter assembly 44 will normally be used to perform the necessary cutting and shaping of the longitudinal edges as indicated at 84 on the stiles or frame members 86. In fact, the edge configurations 84 can be cut on workpieces of substantially great length with the workpieces subsequently cut to the desired length.

The left hand cutter or shaper assembly 44, because of the relatively limited access determined by the upstream positioning of the cutter assembly 102, is particularly adapted for use in defining the necessary end cuts, as indicated at 88 on the frame or stile members 86. Finally, the cutter or shaper assembly 102, having no obstructions to the introduction and removal of workpieces, is particularly adapted for accommodating elongate workpieces such as full height door panels or the like 134. As such, it is to be appreciated that the particular relationship of the cutter assemblies and associated guides and guards, relative to each other, is significant.

Figure 13:
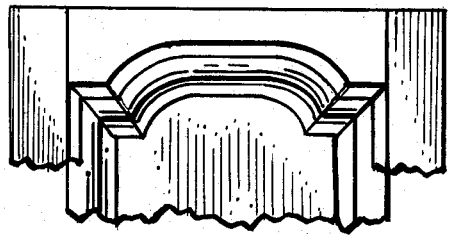
FIG. 13 is a partial elevational view of a structure with an arched upper stile and panel.
Figure 14:
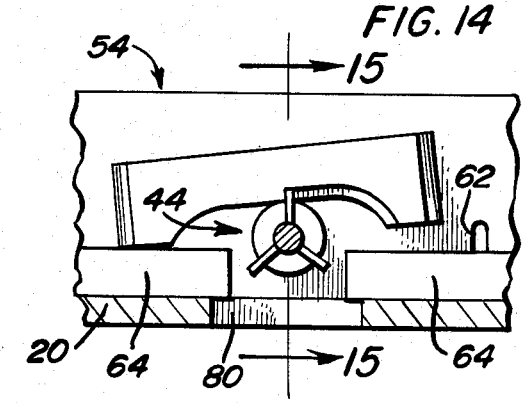
FIG. 14 is a cross-sectional detail illustrating an adjusted relation between the support bars and the shaper assembly to enable the shaping of an arched edge.
Figure 15:
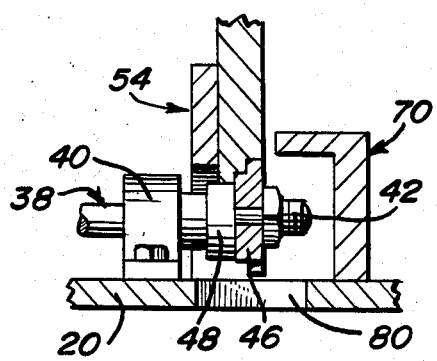
FIG. 15 is a cross-sectional view taken substantially on a plane passing along line 15—15 in FIG. 14.

While the description of the use of the apparatus thus far has emphasized the straight cutting or shaping of workpiece edges, the apparatus is also uniquely adapted for accommodating arched configurations, for example as suggested in the arched upper door stile of FIG. 13. To accommodate the arcuate configuration, which will normally be roughly pre-cut, the bar supports 64 will be moved to their lowermost position. The associated cutter assembly 44 will include, in addition to the actual shaping and cutting components 46, a bearing component 48 which will constitute the sole means for determining the depth of the cut. The workpiece will then be guided through the shaper assembly 44 while maintained firmly against the adjoining guide fence 54 with the workpiece itself supported primarily on the shaft mounted bearing component 48 with this bearing component 48 constituting the sole means for determining the depth of the cut. As the workpiece moves beyond the cutter assembly 44, the workpiece can, as a matter of handling convenience, have the forward extremity thereof engage on and be supported by the appropriate bar support 64.

The foregoing is illustrative of the principles of the invention, including the construction thereof and the manner of use which define an economically feasible apparatus providing a high degree of safety for the users thereof in conjunction with a production capability substantially greater than that currently available.

Additional advantages and capabilities of the apparatus are considered readily apparent from the above descriptions. For example, a changing of the cutter assemblies 44 can be easily effected by merely a removal of the outer finger guard 70, or the guide fence 110 when access to the cutter assembly 102 is desired. While not illustrated, the invention also contemplates the provision of a removable housing or housings over the driven shafts as a protective means for both the equipment and the user of the equipment.

I claim:

1. A wood shaper comprising a horizontal base, a transverse shaft rotatably mounted on and in horizontal overlying relation to said base drive means rotatably driving said shaft, said shaft having opposed free end portions, each end portion mounting a vertically cutting shaper assembly, a pair of guide fences, one guide fence being positioned transversely of said shaft immediately inward of each shaper assembly, each guide fence including a pair of aligned sections projecting laterally beyond said shaft to each side thereof, means for mounting each guide fence to said base, a pair of workpiece support bars extending longitudinally along each guide fence, one support bar on each section of the guide fence in general alignment with the corresponding shaper assembly to each side thereof, means for mounting each support bar on the corresponding guide fence section, a pair of finger guards, one finger guard being positioned transversely across said shaft immediately outward of each shaper assembly and generally paralleling the corresponding guide fence, and means for mounting each finger guard to said base plate.

2. The apparatus of claim 1 wherein said support bars are individually adjustable relative to each other and to the associated shaper assemblies, said means for mounting each support bar including means for selectively mounting the support bar in a vertically adjusted position.

3. The apparatus of claim 2 wherein each finger guard includes an elongate vertical panel having a lower edge seated on said base plate, and a horizontal upper panel inwardly directed toward the associated guide fence in a horizontal plane vertically spaced above the associated shaper assembly.

4. The apparatus of claim 3 wherein each finger guard is laterally adjustable toward and away from the associated guide fence, each finger guard being selectively removable for access to the associated shaper assembly, said means for mounting each finger guard including means for selectively fixing the finger guard in an adjusted position.

5. The apparatus of claim 4 wherein each said fence is selectively adjustable laterally relative to the associated finger guard and shaper assembly, said means for mounting each guide fence including means for selectively fixing said fence in an adjusted position.

6. The apparatus of claim 5 wherein each shaper assembly includes a bearing component defining a cut-depth limiting support for a workpiece as it moves through the shaper assembly.

7. The apparatus of claim 2 wherein the pair of workpiece support bars extending longitudinally along each guide fence include a first support bar positioned to the side of the shaper assembly from which the workpiece is to be introduced, and a second support bar for the workpiece positioned to the side of the shaper assembly toward which the shaped workpiece discharges, said first support bar being positioned at a height relative to the shaper assembly corresponding to the depth of the cut desired, said second support bar being positioned relatively higher than said first support bar for reception and support of the cut workpiece.

8. The apparatus of claim 1 including a second horizontal shaft rotatably mounted on and in overlying relation to said base plate in laterally spaced relation to said first shaft, said drive means rotatably driving said second shaft, said second shaft having a free end portion mounting a vertically cutting shaper assembly generally parallel to and in outwardly spaced relation to one of said first mentioned shaper assemblies, an outer guide fence positioned transversely of said second shaft in outwardly spaced relation to the shaper assembly thereon, an inner finger guard positioned transversely across said second shaft in inwardly spaced relation to the shaper assembly thereon and in generally parallel relation to the corresponding guide fence.

9. The apparatus of claim 8 including a pair of support bars mounted on the guide fence associated with said second shaft and extending to each side of and in alignment with the associated shaper assembly, the guide fence associated with the second shaft extending in laterally spaced parallel relation to at least a portion of the finger guard associated with the corresponding end portion of the first mentioned shaft.

10. The apparatus of claim 9 wherein the support bars associated with the second shaft are mounted for vertical adjustment, and means for fixing the support bars in vertically adjusted positions independently of each other.

11. The apparatus of claim 10 wherein the finger guard associated with said second shaft comprises an elongate vertical panel and a horizontal upper panel coextensive with the vertical panel and projecting outwardly toward the associated shaper assembly.

12. The apparatus of claim 11 wherein the finger guard associated with said second shaft is laterally adjustable toward and away from the corresponding shaper assembly, and means for fixing this finger guard in an adjusted position.

13. The apparatus of claim 12 wherein the guide fence associated with the second shaft is mounted for lateral adjustment toward and away from the associated shaper assembly, and means for fixing this guide fence in an adjusted postion.

14. A wood shaper comprising a horizontal base, a transverse shaft rotatably mounted on and in horizontal overlying relation to said base, drive means rotatably driving said shaft, said shaft having a free end portion, a vertically cutting shaper assembly mounted on said end portion, a guide fence positioned transversely of said shaft immediately inward of said shaper assembly, said guide fence including a pair of aligned sections projecting laterally beyond said shaft to each side thereof, means for mounting said guide fence to said base, a pair of workpiece support bars extending longitudinally along said guide fence, one support bar on each section in general alignment with the shaper assembly to each side thereof, means for mounting each support bar on the corresponding guide fence section, a finger guard positioned transversely across said shaft in parallel relation to the guide fence and to the opposite side of said shaper assembly, and means for mounting said finger guard to said base plate.

15. The apparatus of claim 14 wherein said support bars are mounted for vertical adjustment on said guide fence, and means for fixing said support bars in a vertically adjusted position.

16. The apparatus of claim 15 including means mounting said finger guard for lateral adjustment toward and away from said shaper assembly.

17. The apparatus of claim 16 including means mounting said guide fence for lateral adjustment toward and away from said shaper assembly.

18. The apparatus of claim 17 wherein said shaper assembly includes a bearing for receiving and supporting a workpiece during movement through the shaper assembly, said bearing defining a non-cutting support for a workpiece.

19. The apparatus of claim 15 wherein said shaper assembly includes a bearing for receiving and supporting a workpiece during movement through the shaper assembly, said bearing defining a non-cutting support for a workpiece.

* * * * *